C. N. JOHNSON.
CENTRIFUGAL GOVERNOR FOR MOTORS.
APPLICATION FILED MAR. 30, 1911.
1,033,248.
Patented July 23, 1912.
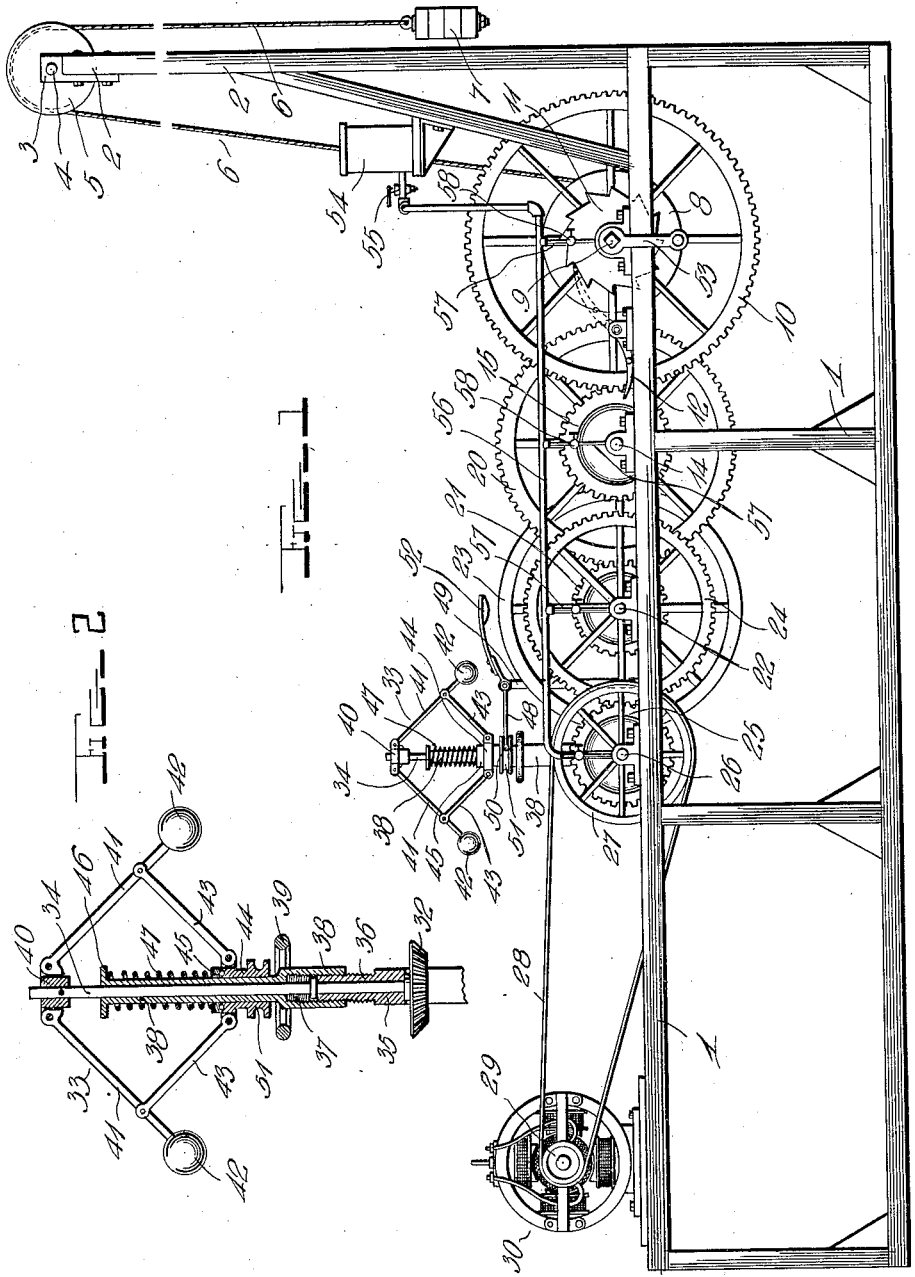
Witnesses
Inventor
C. N. Johnson
by H. B. Willson & Co.
Attorneys

UNITED STATES PATENT OFFICE.

CHARLES NEWTON JOHNSON, OF VINCENNES, INDIANA, ASSIGNOR OF ONE-THIRD TO SAMUEL PIETY RUBLE, OF FRITZEN, INDIANA.

CENTRIFUGAL GOVERNOR FOR MOTORS.

1,033,248.   Specification of Letters Patent.   Patented July 23, 1912.

Application filed March 30, 1911. Serial No. 618,033.

*To all whom it may concern:*

Be it known that I, CHARLES N. JOHNSON, citizen of the United States, residing at Vincennes, in the county of Knox and State of Indiana, have invented certain new and useful Improvements in Centrifugal Governors for Motors; and I do declare the following to be a full, clear, and exact description of the invention, such as will enable others skilled in the art to which it appertains to make and use the same.

This invention relates to centrifugal governors for motors, and it consists in the construction and arrangement of parts, as will be hereinafter described and particularly pointed out in the claim.

In the accompanying drawings: Figure 1 is a side view of my improved motor; Fig. 2 is an enlarged detail vertical sectional view of the adjustable governor mechanism.

In the embodiment of the invention, I provide a supporting frame 1 having on one end upright pulley supporting standards 2 on the upper ends of which are secured bearings 3 in which is revolubly mounted a pulley shaft 4. On the shaft 4 is fixedly mounted a guide pulley 5 with which is engaged a weight supporting cable 6 having on one end a suitable weight 7 and having its opposite ends connected with and adapted to be wound on and off from a drum 8 fixed on a shaft 9 which is revolubly mounted in suitable bearings in the frame 1 as shown.

On the shaft 9 adjacent to one end of the drum 8 is fixedly mounted a power transmitting gear 10 and a ratchet gear 11. With the gear 11 is adapted to be engaged a stop pawl 12 whereby the shaft 9 and gear 10 are locked against turning. The pawl 12 is pivotally connected to the frame 1 in any suitable manner and is adapted to be swung into and out of engagement with the teeth of the ratchet gear 11 as clearly shown in Fig. 1 of the drawings.

Revolubly mounted in the frame 1, a suitable distance from the shaft 9 is a power transmitting shaft 14 on which is loosely mounted a spur gear pinion 15 which is engaged with the gear 10 on the drum shaft 9. The pinion 15 has connected therewith the stationary member of a clutch not shown, the opposite or slidable member of which is slidably keyed to the shaft 14 and is normally held in engagement with the stationary member by a coiled spring not shown. With the slidable clutch member is engaged a suitable shift lever whereby said clutch member may be shifted out of engagement with the stationary clutch member, thus throwing the shaft 14 out of gear and permitting the pinion 15 to run loosely thereon, said clutch mechanism forming no part of the present invention.

On the shaft 14 is fixedly mounted a spur gear 20 which is engaged with a pinion 21 fixedly mounted on a fly wheel shaft 22 which is journaled in suitable bearings on the frame 1 and has mounted thereon a fly wheel 23. On the shaft 22 is also fixedly mounted a spur gear 24 which is engaged with a pinion 25 fixedly mounted on a pulley shaft 26 revolubly mounted in suitable bearings on the frame 1 as shown. On the shaft 26 is mounted a pulley 27 which is connected by a belt 28 to a pulley 29 on a dynamo 30 which may be arranged in any suitable position and is here shown as arranged on the opposite end of the frame 1 from the motor. Also fixedly mounted on the shaft 26 is a bevel gear (not shown) which is in operative engagement with a similar gear 32 on the shaft of a centrifugal governor 33.

The governor 33 comprises a vertically disposed shaft 34 which is revolubly mounted in a bearing bracket 35 secured to one side of the frame 1. The bracket 32 is provided with a tubular exteriorly threaded sleeve 36 with which is adapted to be engaged an interiorly threaded socket 37 formed on the lower end of a governor adjusting sleeve 38. On the sleeve 38 is arranged a hand wheel 39 whereby the latter is turned to screw the socket upwardly and downwardly on the threaded sleeve 36. Fixedly secured to the upper end of the shaft 34 which projects above the upper end of the sleeve 38 is a collar 40 to which are pivotally connected the inner ends of governor arms 41 on the outer ends of which are fixedly mounted governor weights or balls 42. To the arms 41 are connected the outer ends of links 43, the lower ends of which are pivotally connected to a collar 44 which is slidably mounted on the upper portion of the sleeve 38 and is adapted to be shifted up and down on said sleeve by the outward and upward movement of the governor arms 41 when the latter are actuated by the centrifugal movement thereof. Loosely mounted on the sleeve 38 and having a ball bearing engagement with the upper end of the collar 44 is a bearing washer 45 between which and a flange 46 on the upper end of the sleeve 38 is arranged a coiled spring 47 the pressure of which is exerted to hold the collar 44 down on the lower portion of the sleeve 38. By adjustably connecting the sleeve 38 with the bearing bracket 35 through the threaded socket as hereinbefore described the tension of pressure of the spring 41 may be increased or diminished as desired to permit the governor to respond more or less readily to the centrifugal motion thereof.

The action of the governor is applied to the motor to control the speed thereof by means of a brake mechanism comprising a brake arm 48 which is pivotally mounted on a bracket or standard 49 secured to the frame 1. On one end of the brake arm 48 is arranged a forked extension 50 which is adapted to engage an annular groove 51 which, when the lever is rocked by the upward movement of the collar 44 a brake shoe 52 will be applied to the periphery of the fly wheel 23 thereby retarding the movement of the same and the parts of the motor geared thereto thus automatically controlling the operation of the motor and causing the same to run at a uniform speed.

In practice, it is intended to construct the standard 2 of sufficient height and the cable 6 of sufficient length to cause the motor to be operated by the weight for the required length of time thus obviating the necessity of giving the motor further attention after the same has been wound up and set in motion. In arranging the parts for operation, the drum 8 is revolved by means of a crank handle 53 in the desired direction to wind up the cable 6 and thus draw the weight 7 to the desired elevation. When thus wound up the pawl 12 is thrown into engagement with the ratchet gear 11 which will hold the parts against retrograde movement until it is desired to start the operation of the motor. During the winding of the cable on the drum the shiftable clutch member on shaft 14 is shifted to disengage the same from the stationary clutch member thereby causing the pinion 15 to run idly on the shaft 14 which will prevent the reverse movement of the gearing when winding up the cable.

In order to keep the journals of the various motor shafts properly lubricated, I preferably provide an oil tank 54 which is arranged at a suitable elevation above the frame 1 and is provided with a discharge spout having arranged therein a feed regulating valve 55. To the discharge spout of the tank are connected oil conducting pipes 56 which extend downwardly and longitudinally at a suitable distance above and in line within the bearings of the opposite ends of the shafts. The pipes 56 are connected with the shaft bearings by a series of feed pipes 57 in which are arranged cut off valves 58 whereby the flow of the oil through the feed pipes to any of the journals is controlled.

From the foregoing description, taken in connection with the accompanying drawings, the construction and operation of the invention will be readily understood without requiring a more extended explanation.

I claim as my invention:—

A centrifugal governor for motors comprising a frame, a governor sleeve having a screw threaded socket in its lower end, a bracket on the frame having a screw threaded upper end to engage the socket, a vertical shaft inserted through the governor sleeve and rotatably mounted in the bracket, a collar on the governor sleeve, links pivoted at their lower ends to the collar, the upper ends of the links being pivoted to the governor arms, said arms being also pivoted to the collar on the upper end of the vertical shaft, a hand wheel on the socket for adjusting the same on the threaded end of the bracket, a bearing loosely mounted on the governor sleeve and having a ball bearing engagement with the upper end of the collar, a flange on the upper end of the governor sleeve, and a coiled spring contacting with the flange and the bearing.

In testimony whereof I have hereunto set my hand in presence of two subscribing witnesses.

CHARLES NEWTON JOHNSON.

Witnesses:
H. G. ROBINSON,
C. C. MARSHALL.

---

Copies of this patent may be obtained for five cents each, by addressing the "Commissioner of Patents, Washington, D. C."